(12) United States Patent  
Teicher (10) Patent No.: US 7,822,439 B2  
(45) Date of Patent: Oct. 26, 2010

(54) SYSTEM FOR SHARING CREDENTIALS

(75) Inventor: Mordechai Teicher, Hod Hasharon (IL)

(73) Assignee: SanDisk IL Ltd., Kfar Saba (IL)

( * ) Notice: Subject to any disclaimer, the term of this patent is extended or adjusted under 35 U.S.C. 154(b) by 594 days.

(21) Appl. No.: 11/768,909

(22) Filed: Jun. 27, 2007

(65) Prior Publication Data

US 2008/0039138 A1     Feb. 14, 2008

Related U.S. Application Data

(60) Provisional application No. 60/822,250, filed on Aug. 14, 2006.

(51) Int. Cl.
*H04B 1/38* (2006.01)
*H04B 7/00* (2006.01)

(52) U.S. Cl. .................. 455/558; 455/559; 455/41.2

(58) Field of Classification Search ........... 455/558, 455/41.2, 550.1, 411, 557, 559
See application file for complete search history.

(56) References Cited

U.S. PATENT DOCUMENTS

| 2004/0042442 | A1* | 3/2004 | Pecen et al. ............... 370/352 |
| 2006/0154659 | A1* | 7/2006 | Roter et al. ............. 455/422.1 |
| 2007/0004457 | A1* | 1/2007 | Han ............................ 455/558 |
| 2008/0039139 | A1  | 2/2008 | Teicher |

FOREIGN PATENT DOCUMENTS

EP     1 075 155 A1 *  7/2001

| WO | WO 02/19664 A2 | 3/2002 |
| WO | WO 02/21867 A2 | 3/2002 |
| WO | WO 2004/100582 A1 | 11/2004 |

OTHER PUBLICATIONS

International Preliminary Report on Patentability for application No. PCT/IL2007/001006 issued Feb. 17, 2009 (8 pages).
International Search Report for application No. PCT/IL2007/001006 issued Dec. 28, 2007 (5 pages).
Written Opinion for application No. PCT/IL2007/001006 issued Dec. 28, 2007 (8 pages).

* cited by examiner

*Primary Examiner*—Sonny Trinh
(74) *Attorney, Agent, or Firm*—Brinks Hofer Gilson & Lione (57) ABSTRACT

A primary appliance, reversibly engageable with a secondary appliance for sharing credentials, including: a credentials module configured to enable the primary appliance to make/receive phone calls; and an interface with the secondary appliance, the interface including: a physical interface for physically reversibly engaging the primary appliance and the secondary appliance; and a conductive interface for enabling the secondary appliance to communicate with the module upon being physically engaged. A secondary appliance, reversibly engageable with a primary appliance having a credentials module enabling the primary appliance to make/receive phone calls, including: a service module configured to be enabled by the credentials module; and an interface, for the primary appliance, including: an interface for physically reversibly engaging the secondary appliance with the primary appliance; and a conductive interface for enabling communication of the secondary appliance with the credentials module upon the secondary appliance being physically engaged with the primary appliance.

18 Claims, 7 Drawing Sheets

Figure 1

Prior Art

Prior Art

Figure 3A

Prior Art

SYSTEM FOR SHARING CREDENTIALS

RELATED APPLICATIONS

This patent application claims priority under 35 U.S.C. §119(e) to U.S. Provisional Application No. 60/822,250, filed Aug. 14, 2006, which is hereby incorporated by reference in its entirety.

This patent application is related to U.S. patent application Ser. No. 11/768,910 of the same inventor, which is entitled "METHOD FOR SHARING CREDENTIALS" and filed on the same day as the present application. That patent application, also claiming priority to U.S. Provisional Application No. 60/822,250, is incorporated in its entirety as if fully set forth herein.

FIELD AND BACKGROUND OF THE INVENTION

The present invention relates to systems for sharing user credentials in mobile phones, in particular in mobile phones that use SIM (Subscriber Identity Module) cards.

Mobile phones have become a ubiquitous part of society. A mobile phone is typically owned by a user who makes and receives calls for which the user is billed. In recent years, many additional services have been added to mobile phones. Such services include additional communication options (e.g. text messaging, internet access, broadcast reception, and computer connectivity).

Other services use the communication channel to access and transact with remote service providers (e.g. banks, merchants, and content providers offering music, video, ring tones, and news, for example). There are also services confined to the handset unit (e.g. listening to music, viewing video, playing games, and managing contacts and calendar schedules). Some services use short-range communication (e.g. infrared, Bluetooth, or NFC (Near-Field Communication)) for making payments.

Many of the services that are acquired or consumed with a mobile phone require subscription and identification of the user and/or the user rights. A SIM card is an exemplary standard module that maintains data used to determine the identity and rights of a user. Often a SIM card also carries other user-related data (e.g. contact and calendar databases, and downloaded content). Thus, the SIM card converts a general-purpose appliance into a personalized device by maintaining user credentials (i.e. data identifying the user and/or user rights) and/or content owned by the user and stored in the SIM card.

Figure 1:
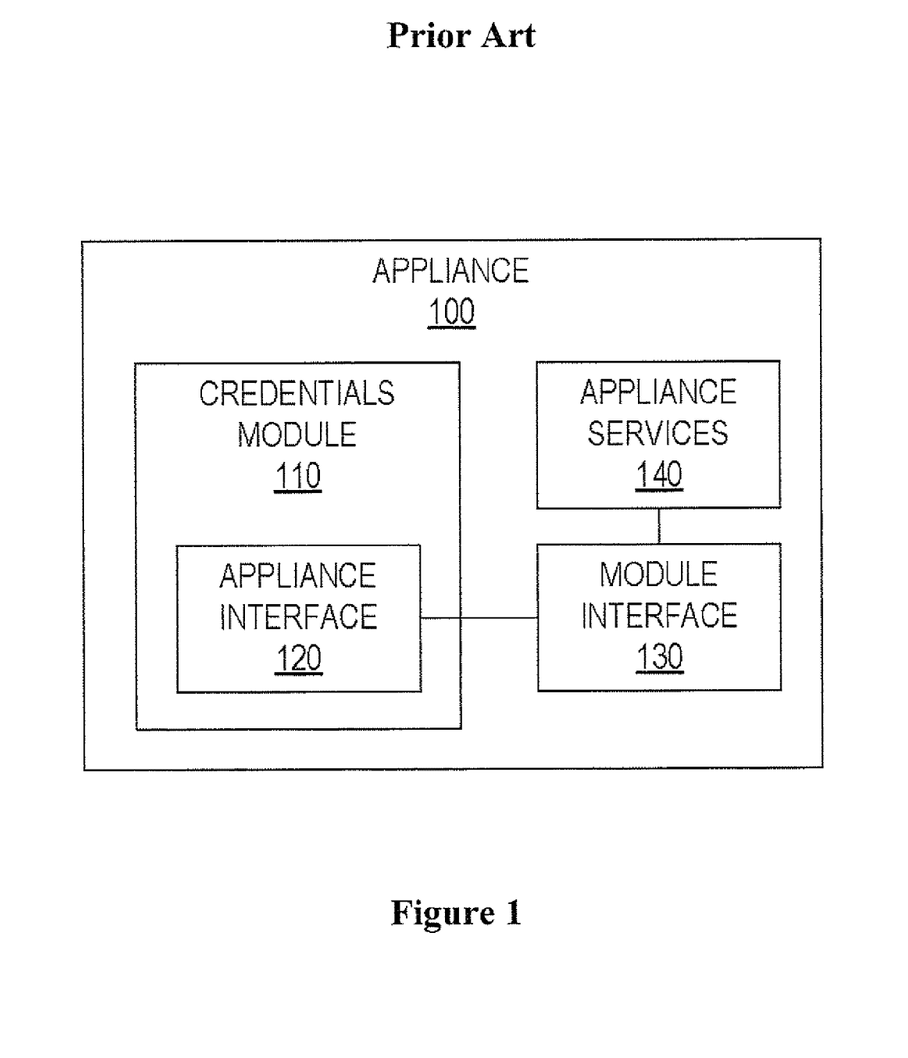
FIG. 1 is a simplified schematic block diagram of a typical mobile appliance, according to the prior art.

FIG. 1 is a simplified schematic block diagram of a typical mobile appliance, according to the prior art. A mobile appliance 100 (e.g. a smart mobile phone) is shown in FIG. 1. A credentials module 110 (e.g. SIM card) is a module that identifies the user, his/her billing account, and optionally other access rights the user may have. Credentials module 110 can also store other personal data (e.g. contact list, calendar, internet favorites, sent/received text messages, and content owned by the user). Credentials module 110 interfaces, via an appliance interface 120 and a module interface 130, with appliance services 140. Appliance services 140 represent a services module that includes the hardware and software components of appliance 100 that provide voice and non-voice services. Appliance interface 120 and module interface 130 are typically conventional electrical contacts for operationally connecting appliance services 140, which require the appropriate user credentials, with credentials module 110.

Often a mobile appliance can be connected to another device to extend the functionality of the appliance. For example, a mobile phone can be connected to a car adapter to offer safer driving via hands-free communication; to a desk cradle to offer better sound quality and a more convenient handset; to a personal computer for synchronizing contacts, calendars, and files; or to a Bluetooth headset for hands-free mobile communication.

Figure 2:
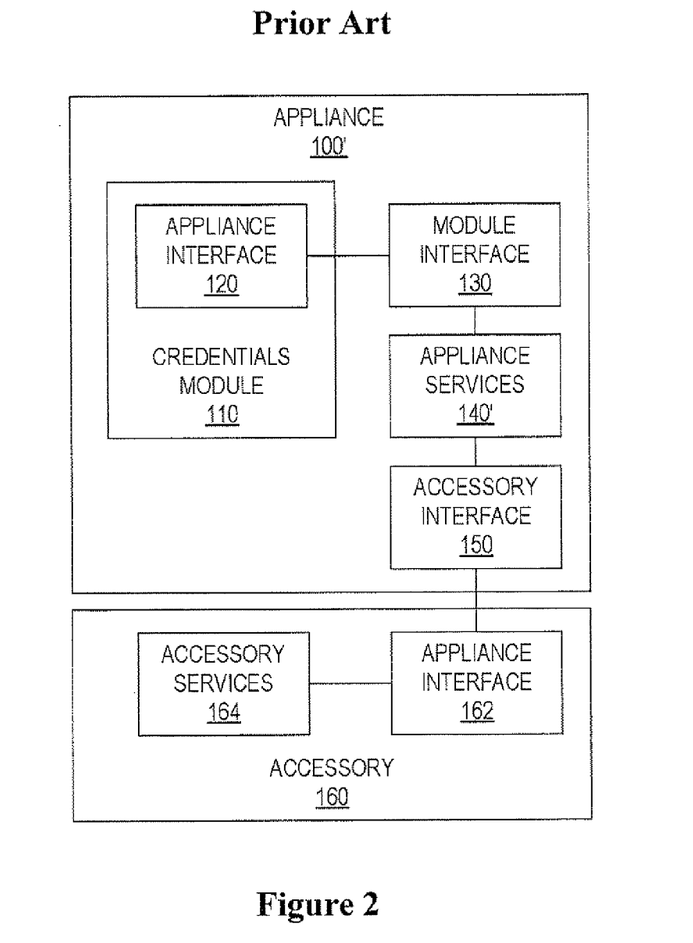
FIG. 2 is a simplified schematic block diagram of a typical mobile appliance connected to an accessory, according to the prior art.

FIG. 2 is a simplified schematic block diagram of a typical mobile appliance connected to an accessory, according to the prior art. A mobile appliance 100' includes an accessory interface 150 for operationally connecting to an accessory 160 via an appliance interface 162. Accessory 160 offers improved or additional services that are represented by accessory services 164. Accessory interface 150 and appliance interface 162 are logical, electrical, and/or physical interfaces (e.g. a socket-receptacle connection, a cradle, and a Bluetooth link) that operationally connect appliance 100' to accessory 160. Current accessories are limited to utilizing the SIM-related services available on the appliance that contains the SIM card, which may be restricted by the features or performance of the appliance.

Figure 3A:
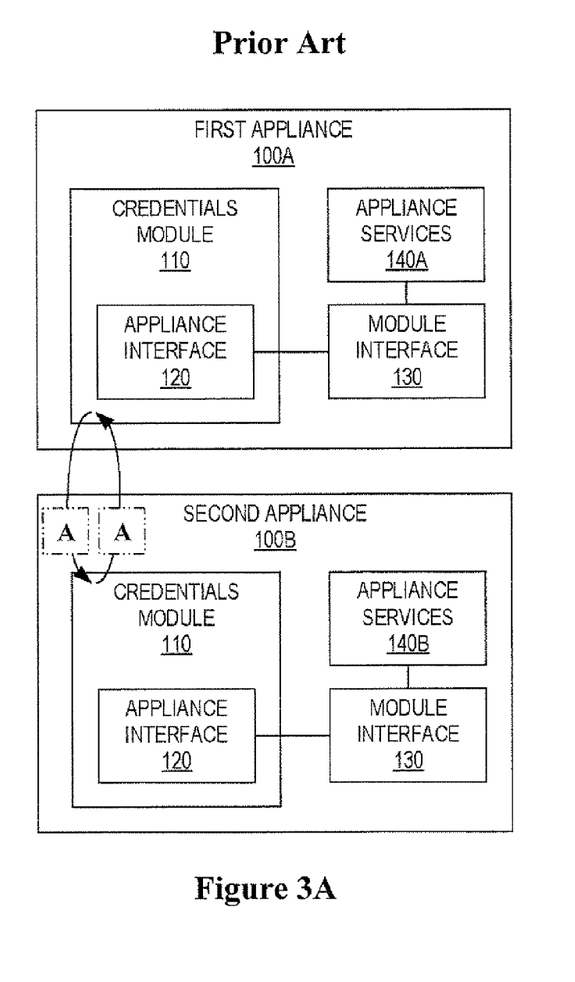
FIG. 3A is a simplified schematic block diagram of two typical mobile appliances, according to the prior art.

The user of a mobile appliance can often move the SIM card from one appliance to another appliance, thereby personalizing and activating the second appliance while depersonalizing and deactivating the first appliance. FIG. 3A is a simplified schematic block diagram of two typical mobile appliances, according to the prior art. A first appliance 100A and a second appliance 100B, offering similar or different appliance services 140A and appliance services 140B, are shown in FIG. 3A. A module transfer-operation A is a manual procedure that allows the user to selectively insert credentials module 110 into either first appliance 100A or second appliance 100B, thereby selectively personalizing and activating the current appliance white deactivating the other appliance. Moving credentials module 110, via module transfer-operation A, from first appliance 100A to second appliance 100B is considered to be an inconvenient task.

Figure 3B:
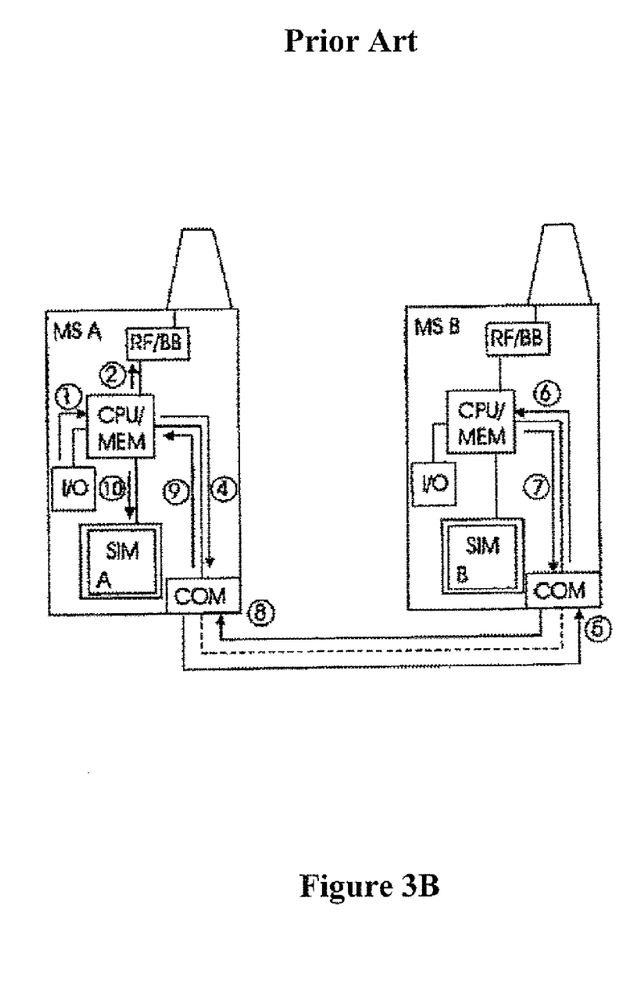
FIG. 3B is a simplified schematic block diagram of two typical mobile appliances, adapted from FIG. 3 of Carlsson '282.

Prior art systems such as that taught by Carlsson, U.S. Pat. No. 6,868,282 (hereinafter referred to as Carlsson '282), hereby incorporated by reference as if fully set forth herein, teach methods for a first appliance to read user credentials from a SIM card residing in the appliance, and to transmit the user credentials to a second appliance in which the user credentials are used for obtaining mobile services. FIG. 3B is a simplified schematic block diagram of two typical mobile appliances, adapted from FIG. 3 of Carlsson '282.

FIG. 3B shows how the two mobile appliances (i.e. an MS A and an MS B) communicate with each other to access whichever SIM card (i.e. a SIM card A and a SIM card B). The methods taught by Carlsson '282 are limited by requiring mediation by the main CPU (CPU/MEM of FIG. 3B) of MS A and/or MS B in order to handle a secure exchange of user credentials stored in SIM card A and/or SIM card B, and by requiring both appliances to be operative in order to allow one appliance to use the user credentials of the other appliance.

It would be desirable for users who carry a first appliance, housing a credentials module, to operate a second appliance by coupling the credentials module of the first appliance to the second appliance without having to remove the credentials module from the first appliance.

SUMMARY OF THE INVENTION

It is the purpose of the present invention to provide systems for sharing user credentials in mobile phones, in particular in mobile phones that use SIM cards.

For the purpose of clarity, the term "appliance" is specifically defined for use herein to refer to a device that serves a user, and is owned by the user or another individual. Thus, a first appliance can be, for example, a cellular handset owned by a user, while the second appliance can be, for example, a car phone owned by the user, or a public phone accessible to the user.

Preferred embodiments of the present invention seek to provide systems for physically engaging a first appliance with a second appliance, and then operationally connecting the second appliance to a credentials module residing in the first appliance, without having to physically remove the credentials module from the first appliance.

Therefore, according to the present invention, there is provided for the first time a system for sharing credentials, the system including: (a) a primary appliance including a credentials module, the primary appliance operative to make and receive phone calls utilizing the credentials module; and (b) at least one secondary appliance configured to: (i) physically engage with the primary appliance, thereby establishing an interface with the credentials module; and (ii) provide a service upon utilizing the credentials module via the interface.

Preferably, the interface is electrically conductive.

Preferably, the interface is a short-range contactless interface.

Most preferably, the short-range contactless interface utilizes at least one communication technology selected from the group consisting of: ISO 14443 technology, NFC technology, Bluetooth technology, infrared technology, and acoustic-interface technology.

Preferably, the service includes at least one service selected from the group consisting of: enabling a phone call, transmitting a text message, providing an identity of a user, providing an identity of a subscription record in an operator's database, providing data allowing the user to access a credit account; providing data allowing the user to access a bank account, providing access to an electronic purse, providing access to contact databases of the user; providing access to calendar databases of the user, providing access to content owned by the user, providing access to ring tones, providing access to music, providing access to video, and providing DRM access codes.

According to the present invention, there is provided for the first time a primary appliance reversibly engageable with a secondary appliance for sharing credentials, the primary appliance including: (a) a credentials module configured to enable the primary appliance to make and receive phone calls; and (b) an interface with the secondary appliance, the interface including: (i) a physical interface for physically reversibly engaging the primary appliance and the secondary appliance; and (ii) a conductive electrical interface operative to enable the secondary appliance to communicate with the credentials module upon being physically engaged.

According to the present invention, there is provided for the first time a secondary appliance, for sharing credentials, reversibly engageable with a primary appliance, the primary appliance having a credentials module enabling the primary appliance to make and receive phone calls, the secondary appliance including: (a) a service module configured to be enabled by the credentials module; and (b) an interface for the primary appliance, the interface including: (i) a physical interface for physically reversibly engaging the secondary appliance with the primary appliance; and (ii) a conductive electrical interface operative to enable communication of the secondary appliance with the credentials module upon the secondary appliance being physically engaged with the primary appliance.

Preferably, the service module includes at least one service selected from the group consisting of: enabling a phone call, transmitting a text message, providing an identity of a user, providing an identity of a subscription record in an operator's database, providing data allowing the user to access a credit account; providing data allowing the user to access a bank account, providing access to an electronic purse, providing access to contact databases of the user; providing access to calendar databases of the user, providing access to content owned by the user, providing access to ring tones, providing access to music, providing access to video, and providing DRM access codes.

These and further embodiments will be apparent from the detailed description and examples that follow.

BRIEF DESCRIPTION OF THE DRAWINGS

The present invention is herein described, by way of example only, with reference to the accompanying drawings, wherein.

DESCRIPTION OF THE PREFERRED EMBODIMENTS

The present invention relates to systems for sharing user credentials in mobile phones, in particular in mobile phones that use SIM cards. The principles and operation for sharing user credentials in mobile phones, according to the present invention, may be better understood with reference to the accompanying description and the drawings.

Figure 4:
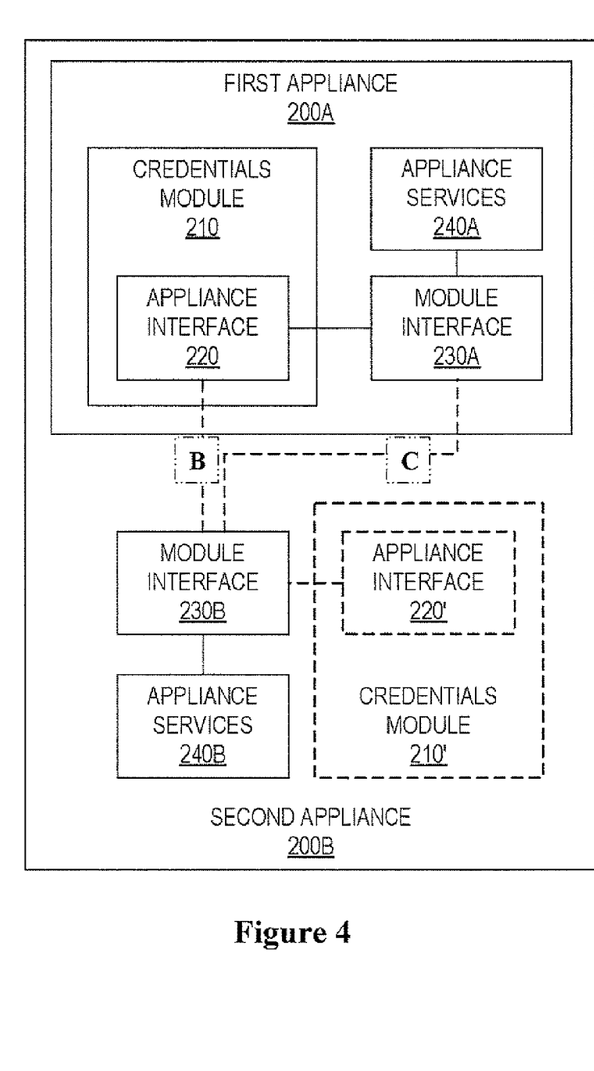
FIG. 4 is a simplified schematic block diagram of two mobile appliances, according to preferred embodiments of the present invention.

Referring now to the drawings, FIG. 4 is a simplified schematic block diagram of two mobile appliances, according to preferred embodiments of the present invention. A first appliance 200A (e.g. a cellular phone) is physically engaged with a second appliance 200B. The expression "physically engaged" is used herein to mean that the body of first appliance 200A is inserted within, or mechanically connected to, the body of second appliance 200B so that first appliance 200A and second appliance 200B temporarily function as a single integrated unit. For example, first appliance 200A can be inserted into a slot of second appliance 200B, or into a cradle that forms part of, or connects to, second appliance 200B.

User credentials stored in a credentials module 210 include, for example: user-specific data (e.g. the identity of the user, and the identity of a subscription record in an operator's database); data allowing the user to access a credit or bank account; an "electronic purse"; contact and calendar databases of the user; content owned by the user (e.g. downloaded ring tones, music, and video); and codes needed for accessing digitally-protected content under a digital rights-management (DRM) scheme.

Credentials module 210 is preferably a secure chip (e.g. a SIM card) that protects content via a tamper-proof physical construction and digital cryptography, Credentials module 210 uses techniques known in the art for enabling operation of appliance 200A. Operation of appliance 200A is enabled by providing identities, codes, and operational parameter. Credentials module 210 may include a microprocessor for executing cryptographic operations (e.g. an encryption scheme, a challenge-response routine, a digital signature, and a password-generation procedure).

Credentials module 210 is operationally connected, via an appliance interface 220 and a module interface 230A, to appliance services 240A. Appliance interface 220 and module interface 230A include mechanical, electrical, and logical connections as mentioned above. Appliance interface 220 and module interface 230A can be based, for example, on the card and reader interfaces, respectively, defined under the ISO 7816 standard. First appliance 200A includes hardware and software for providing appliance services 240A (e.g. a service module for enabling telephony, text messaging, storage, and multimedia). At least some of appliance services 240A require access and use of user credentials in credentials module 210.

In a similar manner, second appliance 200B includes a credentials module 210', an appliance interface 220', a module interface 230B, and appliance services 240B. Appliance services 240B can be similar and/or different from appliance services 240A. For example, second appliance 200B can be a high-powered, hands-free car phone integrated with a digital radio receiver for subscription-based broadcasts. In such a example, appliance services 240B include the hardware and software for both cellular telephony and digital radio reception, both of which require the presence of credentials module 210' for operation.

According to preferred embodiments of the present invention, first appliance 200A can be physically engaged with second appliance 200B, enabling appliance services 240B to utilize credentials module 210 of first appliance 200A. The physical engagement can be made through direct connection of module interface 230B to either appliance interface 220 via a connection B, or to module interface 230A via a connection C. This will be described in greater detail with regard to FIGS. 5A-D below. Thus, when first appliance 200A is physically engaged with second appliance 200B, second appliance 200B utilizes credentials module 210 of first appliance 200A for operation.

In contrast to the prior art of FIG. 3A, first appliance 200A is preferably off (i.e. inoperative) when second appliance 200B is utilizing credentials module 210. Thus, connection is made between second appliance 200B and credentials module 210, and not between second appliance 200B and first appliance 200A.

The operational mode described above with respect to first appliance 200A and second appliance 200B, in which second appliance 200B utilizes the user credentials from credentials module 210 of first appliance 200A, does not necessarily exclude the conventional mode of operation of the prior art (i.e. module transfer-operation A of FIG. 3A). In such a prior-art operational mode, credentials module 210' is removed from first appliance 200A, and inserted into second appliance 200B, instead of attaching first appliance 200A to second appliance 200B.

Figure 5A:
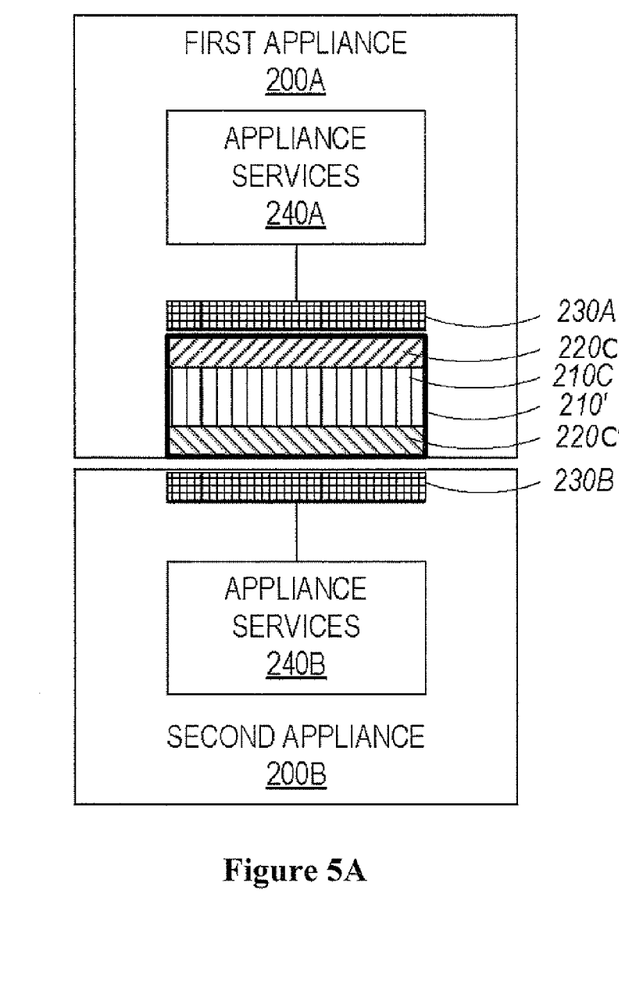
FIG. 5A is a simplified schematic block diagram of an exemplary alternative for implementing connections B and C of FIG. 4, according to preferred embodiments of the present invention.

FIG. 5A is a simplified schematic block diagram of an exemplary alternative for implementing connections B and C of FIG. 4, according to preferred embodiments of the present invention. In FIG. 5A, a credentials module 210' includes a chip/body 210C sandwiched between an upper contact surface 220C and a lower contact surface 220C'. Such a configuration enables credentials module 210' to be accessed either via connection C to module interface 230A for operation of first appliance 200A, or via connection B to module interface 230B for operation of second appliance 200B, as shown in FIG. 4. The bodies of first appliance 200A and second appliance 200B are configured to allow physical contact between contact surface 220C' and module interface 230B upon engagement of first appliance 200A with second appliance 200B.

Figure 5B:
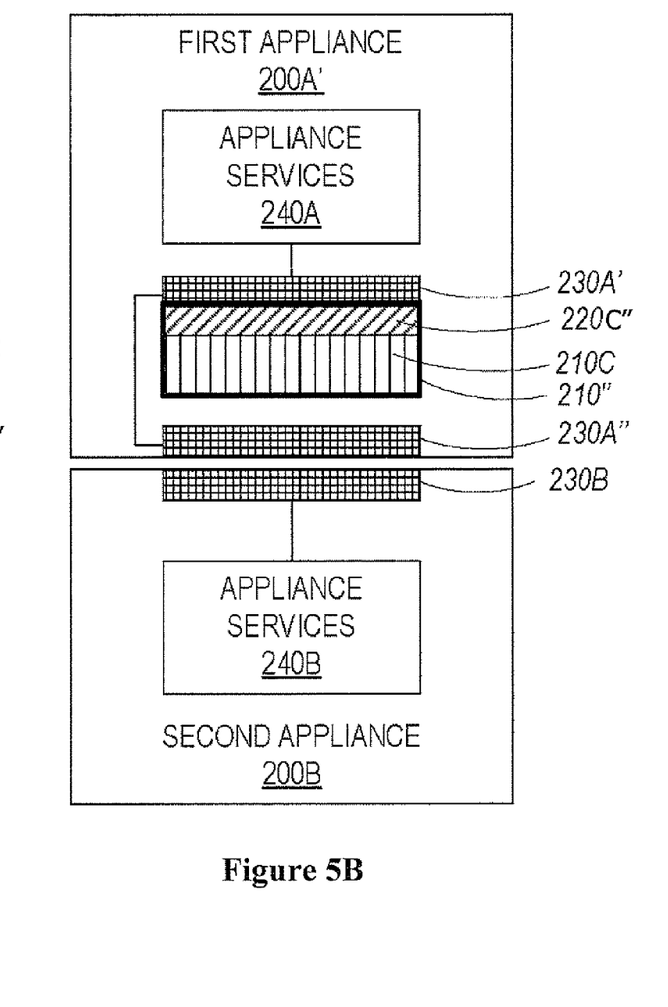
FIG. 5B is a simplified schematic block diagram of an exemplary alternative for implementing connections B and C of FIG. 4, according to another preferred embodiment of the present invention.

FIG. 5B is a simplified schematic block diagram of an exemplary alternative for implementing connections B and C of FIG. 4, according to another preferred embodiment of the present invention. In FIG. 5B, a credentials module 210" has only a single contact surface 220C" for chip/body 210C. Contact surface 220C" physically connects to a first module interface 230A', enabling access of credentials module 210" with appliance services 240A. First module interface 230A' is electrically connected to a second module interface 230A", which is configured to interface with module interface 230B of second appliance 200B when physically engaged with a first appliance 200A', allowing credentials module 210" to be accessed by appliance services 240B via contact surface 220C", first module interface 230A', second module interface 230A", and module interface 230B.

Figure 5C:
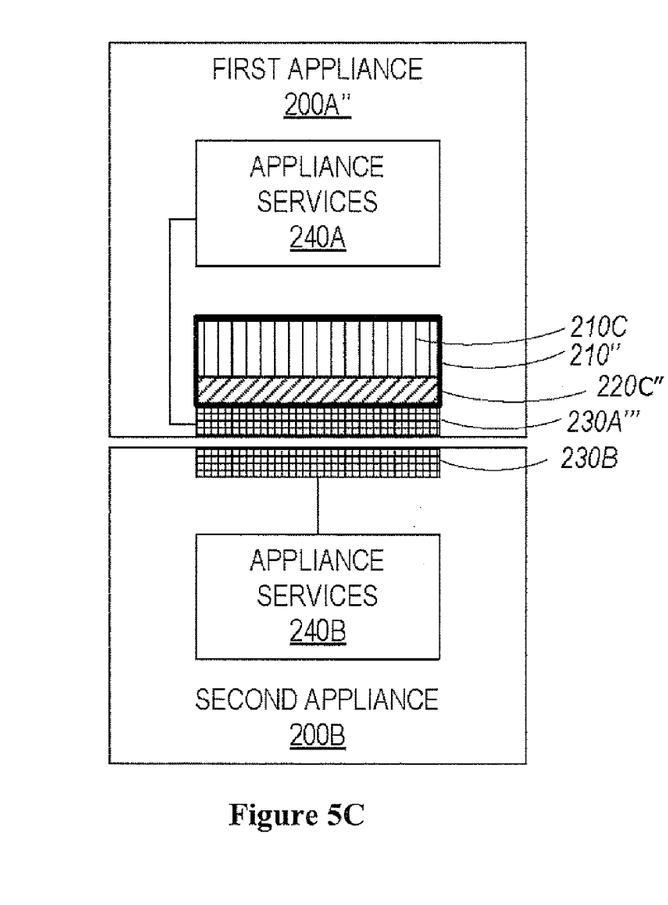
FIG. 5C is a simplified schematic block diagram of an exemplary alternative to the embodiment of FIG. 5B, according to preferred embodiments of the present invention.

FIG. 5C is a simplified schematic block diagram of an exemplary alternative to the embodiment of FIG. 5B, according to preferred embodiments of the present invention. In FIG. 5C, a dual-sided module interface 230A''' connects credentials module 210", of a first appliance 200A", to appliance services 240A and to appliance services 240B (via contact with module interface 230B).

Figure 5D:
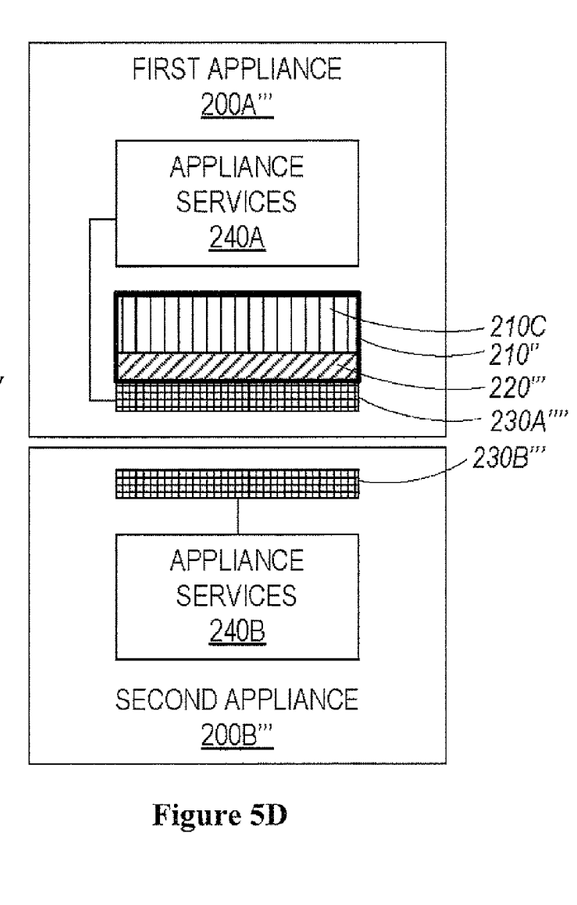
FIG. 5D is a simplified schematic block diagram of an exemplary alternative to the embodiment of FIG. 5C, according to preferred embodiments of the present invention.

FIG. 5D is a simplified schematic block diagram of an exemplary alternative to the embodiment of FIG. 5C, according to preferred embodiments of the present invention. In FIG. 5D, a module interface 230A''' and module interface 230B''' employ a contactless-communication mechanism when connecting credentials module 210" of a first appliance 200A''' to a second appliance 200B'''. Since the amount of data typically exchanged between credentials module 210" and second appliance 200B''' is very small, and since both first appliance 200A''' and second appliance 200B''' are autonomously powered by independent power sources, the contactless-communication mechanism can utilize any wireless communication technology known in the art (e.g. ISO 14443, NFC, Bluetooth, infrared, and acoustic interface).

Figure 6:
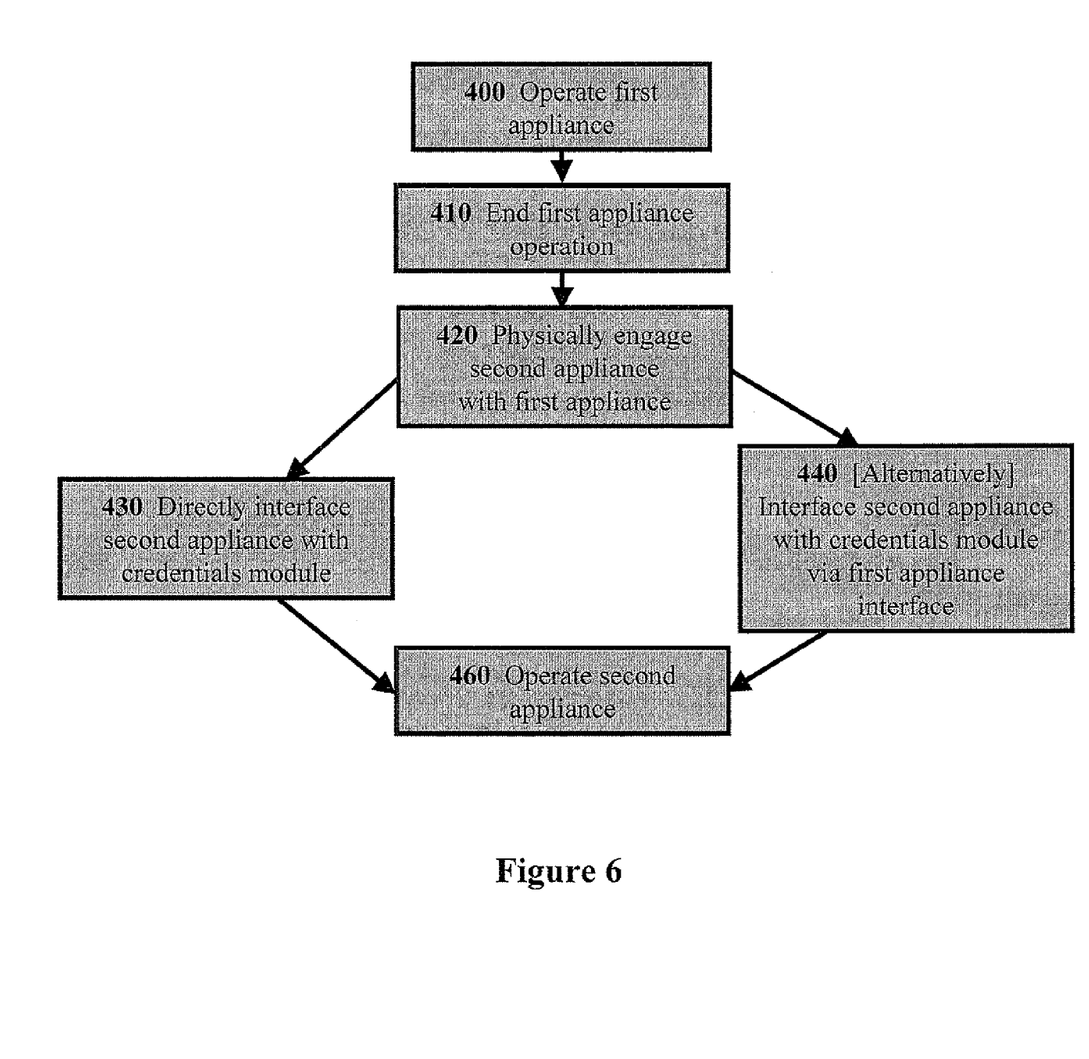
FIG. 6 is a simplified flowchart of the operation of a credential-sharing system, according to preferred embodiments of the present invention.

FIG. 6 is a simplified flowchart of the operation of a credential-sharing system, according to preferred embodiments of the present invention. The components (and reference numerals) of FIG. 4 are included in the description for better clarity. First appliance 200A, housing credentials module 210, is utilized to access the user credentials required for operation (Step 400). Operation of first appliance 200A is then terminated (Step 410). First appliance 200A is then physically engaged with second appliance 200B (e.g. by inserting first appliance 200A into a slot or cradle of second appliance 200B) (Step 420).

The physical connection of first appliance 200A with second appliance 200B (Step 420) establishes a direct contact between credentials module 210 and second appliance 200B (Step 430), as in the embodiment of FIG. 5A. Alternatively, the physical connection of first appliance 200A with second appliance 200B (Step 420) establishes an indirect contact between credentials module 210 and second appliance 200B via module interface 230A of first appliance 200A (Step 440), as in the embodiments of FIGS. 5B-D. Steps 430 and 440 both enable second appliance 200B to communicate with credentials module 210 (residing in first appliance 200A) in order to receive the user credentials required for operation of second appliance 200B (Step 460).

It is noted that communication between second appliance 200B and credentials module 210 is preferably made by using standard appliance/credentials-module protocols, and is preferably made without involvement or mediation by any processor, or communication functionality, that forms part of first appliance 200A. It will be appreciated that the user credentials accessed by first appliance 200A from credentials module 210 in Step 400 may be the same or different than the user credentials accessed by second appliance 200B from credentials module 210 in Step 460. In both cases (i.e. Steps 400 and 460), such user credentials may be responsive to specific operations selected by the user (e.g. making phone calls, listening to a digital radio broadcast, and initiating electronic banking transactions).

It should be emphasized that while first appliance 200A, housing credentials module 210, is typically a mobile appliance (preferably a cellular phone), second appliance 200B can be a mobile or stationary device (e.g. another cellular phone, car-phone handset, a desk accessory, and a personal computer). It should be further emphasized that second appliance 200B can include an independent credentials module (i.e. credentials module 210'), and/or be configured to receive credential module 210 of first appliance 200A after removal from first appliance 200A.

While the invention has been described with respect to a limited number of embodiments, it will be appreciated that many variations, modifications, and other applications of the invention may be made.

What is claimed is:

1. A primary appliance reversibly engageable with a secondary appliance for sharing credentials, the primary appliance comprising:
   a credentials module configured to enable the primary appliance to make and receive phone calls; and
   a primary appliance interface operative to enable a secondary appliance to communicate with the credentials module, the primary appliance interface including:
      a physical interface for physically reversibly engaging the primary appliance with the secondary appliance;
   wherein the credentials module is configured such that the secondary appliance communicates with the credentials module and provides a service while the primary appliance is inoperative.

2. The primary appliance of claim 1, wherein the physical interface is electrically conductive.

3. The primary appliance of claim 1, wherein the primary appliance interface further includes a short-range contactless interface.

4. The primary appliance of claim 3, wherein the short-range contactless interface utilizes communication technology including one or more of: ISO 14443 technology, NFC technology, Bluetooth technology, infrared technology, or acoustic-interface technology.

5. The primary appliance of claim 1, wherein the service includes one or more of:
   enabling a phone call, transmitting a text message, providing an identity of a user, providing an identity of a subscription record in an operator's database, providing data allowing said user to access a credit account;
   providing data allowing said user to access a bank account, providing access to an electronic purse, providing access to contact databases of said user; or
   providing access to calendar databases of said user, providing access to content owned by said user, providing access to ring tones, providing access to music, providing access to video, and providing DRM access codes.

6. The primary appliance of claim 1, wherein the primary appliance is a cellular handset.

7. The primary appliance of claim 1, wherein the secondary appliance is a cellular handset.

8. The primary appliance of claim 1, wherein the secondary appliance is a car phone.

9. The primary appliance of claim 1, wherein the secondary appliance is a public phone.

10. The primary appliance of claim 1, wherein the credentials module comprises a subscriber identity module (SIM) card.

11. The primary appliance of claim 1, wherein the primary appliance interface is one or both of mechanical and electrical.

12. A secondary appliance, for sharing credentials, reversibly engageable with a primary appliance, the primary appliance having a credentials module enabling the primary appliance to make and receive phone calls, the secondary appliance comprising:
   a service module configured to be enabled by the credentials module; and
   a secondary appliance interface operative to enable the secondary appliance to communicate with the credentials module of the primary appliance when the secondary appliance is interfaced with the primary appliance, the secondary appliance interface including:
      a physical interface for physically reversibly engaging the secondary appliance with the primary appliance; and
   wherein the secondary appliance is configured to communicate with the credentials module while the primary appliance is inoperative.

13. The secondary appliance of claim 12, wherein the service module includes a service including one or more of:
   enabling a phone call, transmitting a text message, providing an identity of a user, providing an identity of a subscription record in an operator's database, providing data allowing said user to access a credit account;
   providing data allowing said user to access a bank account, providing access to an electronic purse, providing access to contact databases of said user; or
   providing access to calendar databases of said user, providing access to content owned by said user, providing access to ring tones, providing access to music, providing access to video, and providing DRM access codes.

14. A method for sharing credentials between a first appliance, having a credentials module, and a second appliance, the method comprising the steps of:

physically engaging a second appliance with a first appliance, where the first appliance comprises a credentials module and is configured to communicate with the credentials module to make and receive phone calls;

wherein physically engaging the second appliance with the first appliance interfaces the second appliance with the credentials module for enabling a service of the second appliance; and wherein the second appliance is configured to communicate with the credentials module while the first appliance is inoperative.

15. The method of claim 14, wherein the interfacing includes engaging electrical contact.

16. The method of claim 14, wherein the interfacing includes using a short-range contactless interface.

17. The method of claim 16, wherein the short-range contactless interface utilizes communication technology including one or more of: ISO 14443 technology, NFC technology, Bluetooth technology, infrared technology, and acoustic-interface technology.

18. The method of claim 14, wherein the service includes one or more of:

enabling a phone call, transmitting a text message, providing an identity of a user, providing an identity of a subscription record in an operator's database, providing data allowing said user to access a credit account;

providing data allowing said user to access a bank account, providing access to an electronic purse, providing access to contact databases of said user; or providing access to calendar databases of said user, providing access to content owned by said user, providing access to ring tones, providing access to music, providing access to video, and providing DRM access codes.

* * * * *